United States Patent Office 2,995,564
Patented Aug. 8, 1961

2,995,564
THIOPHENE DERIVATIVES
Max Duennenberger, Birsfelden, Adolf Emil Siegrist, Basel, and Erwin Maeder, Muenchenstein, Switzerland, assignors to Ciba Limited, Basel, Switzerland
No Drawing. Filed Sept. 1, 1959, Ser. No. 837,327
Claims priority, application Switzerland Sept. 2, 1958
8 Claims. (Cl. 260—307)

This invention relates to new derivatives of thiophene, to processes for their production and to the uses thereof.

According to the present invention there are provided thiophene derivatives of the general Formula I:

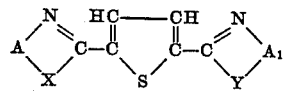

wherein A and $A_1$ represent benz groups or methyl-substituted benz groups which each have two vicinal carbon atoms in common with the fused azole ring, and wherein X and Y are the same or different and each either represents a group >N—R, wherein R may be the same or different in each of the two rings, and is a hydrogen atom or an organic substituent, or represents an oxygen atom, and the salts, including the quaternary ammonium salts, of the benzimidazole compounds of the said formula.

The invention accordingly relates to symmetrical and asymmetrical thiophene derivatives in which the thiophene radical carries in the 2 and 5 positions either benzimidazyl or benzoxazolyl groups, and the salts including the quaternary ammonium salts, of the said benzimidazyl derivatives.

Where the benz radicals A and $A_1$ carry a methyl substituent, this is preferably situated so as to be in the 5- or 6-position of the resulting benzimidazole or benzoxazole radical.

The group R in the foregoing formula, when not a hydrogen atom, may be an organic radical of any desired type, for example an acyl radical, an aliphatic radical or an araliphatic radical, preferably an alkyl, alkenyl or hydroxyalkyl radical of low molecular weight, such for example as a methyl, ethyl, isopropyl, allyl or hydroxyethyl radical.

The salts of the new imidazole thiophene derivatives may be derived from any inorganic or organic acids, for example from sulfuric acid, hydrochloric acid or phosphoric acid, or from arylsulfonic acids, for example from toluene-p-sulfonic acid.

Of the imidazole compounds, those having in all at most two substituents are particularly valuable, for example 2,5-di-[2'-benzimidazyl]-thiophenes which contain either no further substituents or wherein (referring to the general Formula I) A or $A_1$ carries a methyl group and the R groups are hydrogen or A and $A_1$ are benzene and the R groups are methyl, hydroxy alkyl containing 2 or 3 carbon atoms or benzyl, or A and $A_1$ are benzene, one R is hydrogen and the other is methyl, hydroxyalkyl containing 2 or 3 carbon atoms or benzyl.

According to a further feature of the present invention there is provided a process for the production of thiophene derivatives of general Formula I which comprises reacting a compound of the general Formula II:

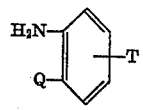

where Q represents NHR or OH (R having the meaning assigned to it above) and T represents hydrogen or a methyl group, or a salt of a compound of general Formula II, at elevated temperatures, and preferably in the presence of catalysts, with thiophene-2,5-dicarboxylic acid of the formula:

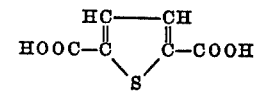

or with functional derivatives thereof, and, if desired, sulfonating the condensation products thus obtained and, in the case where imidazolyl thiophene derivatives are obtained, if desired, acylating, alkylating, alkenylating, hydroxyalkylating or aralkylating them and/or converting them into quaternary ammonium compounds.

Suitable starting materials in the preparation of the new thiophene derivatives of general Formula I are, for example, in the case of imidazylthiophene compounds, 1,2 - diaminobenzene, 1-amino-2-monomethylaminobenzene and 1-methyl-3,4-diaminobenzene. In the case of the oxazolyl thiophene derivatives, there may be employed as starting materials 1-hydroxy-2-aminobenzene and 1-hydroxy-2-aminomethylbenzenes, such as 1-hydroxy-2-amino-4- or 5-methylbenzene.

Where a functional derivative of thiophene-2,5-dicarboxylic acid is employed, this may conveniently be an ester of the said acid, preferably an ester formed with an aliphatic alcohol of low molecular weight, for example the dimethyl ester or diethyl ester.

Advantageously, the starting materials are reacted together at least approximately in the theoretically correct proportion, that is to say, there are employed to 1 mol of dicarboxylic acid 2 mols of the o-diamino- or of the o-hydroxyamino compound or a quantity differing only slightly therefrom. The reaction between the two components in each instance takes place by heating, preferably to relatively high temperatures, for example to 160° to 260° C., and advantageously in an inert gas, for example a current of nitrogen. The reaction is preferably carried out in the presence of a catalyst. Suitable catalysts, are, for example, boric acid and polyphosphoric acids, including pyrophosphoric acid. The reaction is advantageously so controlled that compounds of general Formula I are directly formed, that is to say, that the acylation of the o-amino compounds and the ring closure to form the azole ring concerned take place in one operation.

When one mol of thiophene-2,5-dicarboxylic acid is reacted with 2 mols of 1,2-diaminobenzene, for example, the course of the reaction may be diagrammatically represented as follows:

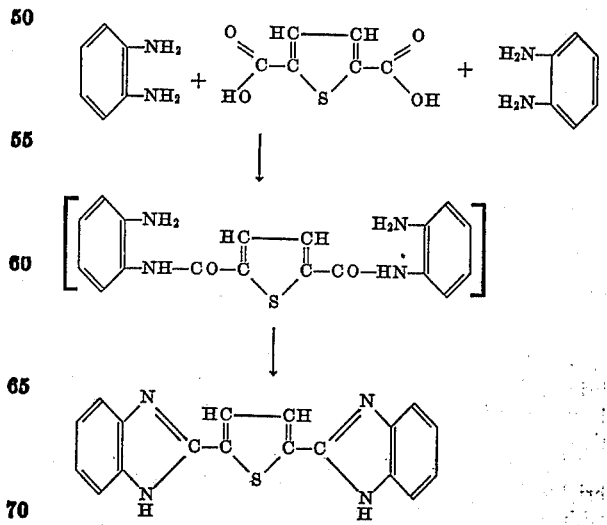

When operating with boric acid as catalyst, this acid is advantageously employed in a quantity of about 0.5% to 5% calculated on the total weight of the reaction mass. If desired, when employing boric acid, an inert solvent of high boiling point, for example dichlorobenzene, trichlorobenzene or p-cymene, may also be employed.

The imidazole thiophene derivatives of general Formula I obtainable in accordance with the invention, in which X and/or Y represent the group >N—H (i.e. compounds not substituted on the saturated nitrogen atom by an organic radical) may optionally be acylated, alkylated, alkenylated, hydroxyalkylated or aralkylated. The acylation is carried out by methods known per se, for example by treatment of the said thiophene derivatives with carboxylic acid chlorides, such as acetyl or benzoyl chloride, in an anhydrous inert organic solvent. The optional alkylation, alkenylation, hydroxyalkylation or aralkylation may also be carried out in the usual manner, for example by treatment with alkylhalides such as ethyl chloride, alkylene halides such as allyl bromide, alkylene halohydrins, for example ethylene or propylene chlorhydrin, or with aralkyl halides such as benzyl chloride, preferably with an addition of an acid-binding agent. Dialkyl sulfates such as dimethyl sulfate may also be employed for the alkylation.

Quaternary ammonium salts of the imidazole thiophene derivatives of general Formula I may be obtained by reacting the imidazole thiophene derivatives or salts thereof with compounds capable of quaternizing an imidazol nitrogen atom. Such compounds include the usual alkylation and aralkylation agents e.g. methyl iodide, ethyl bromide, isopropyl chloride, secondary butyl bromide, dodecyl bromide, epichlorhydrin, dimethyl sulfate; benzyl halides and benzyl halides substituted in the nucleus, for example by halogen, alkyl or alkoxy groups, such as benzyl chloride and p-chlorobenzyl chloride; menaphthyl chloride; toluene-sulfonic acid esters; arylsulfonic acid alkyl esters, more especially those of the benzene series with alkyl groups of low molecular weight, such as toluene-sulfonic acid ethyl or methyl ester; and compounds containing a water solubilizing group, such as haloalkyl- or aralkylsulfonic acids, for example bromoethanesulfonic acid and benzyl chloride-disulfonic acid. Where salts of di-imidazoles are used as starting materials, alkylene oxides, such as ethylene oxide or propylene oxide, or glycidol may be employed for the quaternization, or aliphatic alcohols of low molecular weight, such as methanol or ethanol. The quaternization takes place under the conditions usual for such a reaction, preferably by heating the components to elevated temperature, for example 50° to 200° C., optionally under pressure. The simultaneous use of inert solvents such as alcohols, for example methanol, ethyl alcohol, dioxan, glycol, monomethylglycol, benzene, toluene or nitrobenzene, or mixtures of such solvents, may be advantageous. In some cases, it may be desirable to use an excess of quaternizing agent.

For the sulfonation of the thiophene derivatives the compounds of general Formula I may be treated in the usual manner for sulfonation, for example with sulfuric acid monohydrate, chlorosulfonic acid or sulfuric acid containing sulfur trioxide, if desired at elevated temperature.

The thiophene derivatives of general Formula I and the salts, including the quaternary ammonium salts, of the imidazolyl compounds of the said Formula I have more or less pronounced fluorescence in solution or finely divided form. They may be employed as optical brightening agents, more especially for application to fibrous material, or as intermediate products in the preparation of dyes.

The new fluorescent compounds may be employed for brightening by impregnating the material to be treated with solutions of the compounds, preferably aqueous solutions if the products are water-soluble, or dispersions of the compounds, and drying the material after centrifuging or mangling. In addition to the aforesaid aqueous solutions, solutions in organic solvents may be employed for the treatment according to the invention, especially in the case of products which are sparingly soluble or insoluble in water. It is furthermore possible to treat materials with the compounds in dispersed form, for example dispersions obtained with dispersing agents such as soaps, soap-like substances, polyglycol ethers of fatty alcohols, waste sulfite liquor or products of condensation of naphthalene sulfonic acids or alkylated naphthalene sulfonic acids with formaldehyde.

The new brightening agents may also be employed in the course of the process of preparation of the materials which are required to be brightened for example by adding them to a paper mass, or to a composition such as a viscose solution or one consisting of a linear synthetic polyamide, or a solution of acetyl cellulose to be used for spinning to filamentary form or for the production of films.

The new thiophene derivatives employed as brighteners may also be employed as follows:

(a) In mixture with dyes or as an additive to dye baths, printing, discharge or resist pastes, or for the after-treatment of dyes, prints or discharge prints.

(b) In mixtures with chemical bleaches or as an additive to bleaching baths.

(c) In mixture with dressing agents, such as starch or synthetically obtainable dressings. The products of the invention may also be added, for example, to the solutions employed to produce a crease-proof finish.

(d) In combination with detergents. The detergents and brighteners may be separately added to the washing baths to be employed. It is also advantageous to employ detergents with which the brighteners are admixed. Suitable detergents are, for example, soaps, salts of sulfonate detergents, for example of sulfonated benzimidazoles substituted on the 2-position carbon atom by higher alkyl radicals, or salts of monocarboxylic acid esters of 4-sulfophthalic acid with higher fatty alcohols, or salts of fatty alcohol sulfonates, alkylarylsulfonic acids, or products of condensation of higher fatty acids with aliphatic hydroxy- or aminosulfonic acids. In addition, non-ionic detergents may be employed, for example polyglycol ethers, which are derived from ethylene oxide and higher fatty alcohols, alkyl phenols or fatty amines.

The following examples will serve to illustrate the invention. Where not otherwise stated, the parts are by weight, the percentages are by weight and the temperatures are in degrees centigrade.

*Example 1*

5.4 parts of 1,2-diaminobenzene, 4.5 parts of thiophene-2,5-dicarboxylic acid and 0.1 part of boric acid are melted in a current of nitrogen at 185° to 190°. As soon as a uniform melt has been formed, the temperature is raised to 210°–220°, a violent splitting-off of water taking place. After 30 minutes, the melt gradually solidifies. The temperature is maintained for 20 more minutes at 210–200° and the melt is thereafter allowed to cool to 150° and 70 parts of dimethylformamide are added to the solidified melt. After approximately 10 minutes, a dark-red solution is obtained, which is poured into 300 parts of N hydrochloric acid at 100°. The crystal paste formed is stirred for half an hour at 80–85°, allowed to cool to room temperature and suction-filtered. The filtrate is emulsified in 300 parts of water and such a quantity of aqueous ammonia solution is added at 60–70° that a distinct alkaline reaction can still be observed after half an hour.

The reaction mixture is thereafter allowed to cool to room temperature, suction-filtered and washed to neutrality with water, and the product of condensation is dried in vacuo at 100-110°. There are thus obtained 5.3 parts of the compound of the formula:

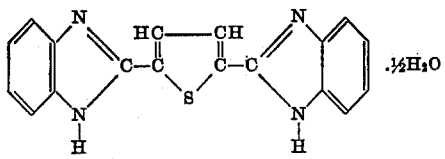

in the form of pale yellow needles M.P. above 350°. After three recrystallizations from a mixture of ethanol and water, the following analysis values are obtained for the products:

Calculated: C, 66.44; H, 4.03; O, 2.46; N, 17.22. Found: C, 66.94; H, 4.19; O, 2.59; N, 17.20.

2,5-di-[N-methylbenzimidazyl-(2')]-thiophene is obtained if, in the present example, 6.1 parts of 1-amino-2-monomethyl amino benzene are employed as starting material instead of 5.4 parts of 1,2-diaminobenzene.

*Example 2*

123 parts of 1-hydroxy-2-amino-4-methylbenzene, 86 parts of thiophene-2,5-dicarboxylic acid and 3 parts of boric acid are stirred in a current of nitrogen for 1 hour at 215-220°. 600 parts of dimethylformamide are then added at 140°, whereby a dark solution is formed. 1500 parts of water are then added dropwise with stirring. The precipitated substance of the formula:

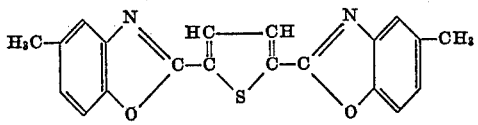

is suction-filtered and dried. Yield: 120 parts: M.P. 213-214°.

After recrystallization four times from a mixture of ethanol and water the product melts at 215-215.8° and has the following analysis data:

Calculated: C, 67.97; H, 4,85; N, 15.85. Found: C, 69.55; H, 4.11; N, 8.04.

*Example 3*

If in Example 1 the 5.4 parts of 1,2-diaminobenzene are replaced by 6.1 parts of 4-methyl-1,2-diaminobenzene, the product of the following formula is obtained:

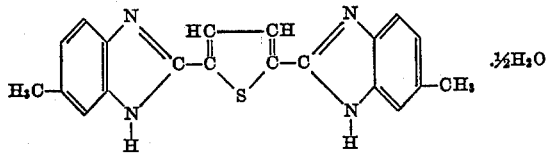

in the form of pale yellow needles M.P. above 350°. Yield: 5.5 parts. Analysis of a product recrystallized several times from a mixture of ethanol and water:

Calculated: C, 67.97; H, 4.85; N, 15.85. Found: C, 68.09; H, 4.90; N, 15.65.

*Example 4*

10.9 parts of 1-hydroxy-2-aminobenzene, 8.6 parts of thiophene-2,5-dicarboxylic acid and 0.3 part of boric acid are stirred for 1 hour in a current of nitrogen at 230-240°. 150 parts of dimethylformamide are then added at 140°, whereafter 300 parts of water are added dropwise at 90°. The precipitated substance of formula:

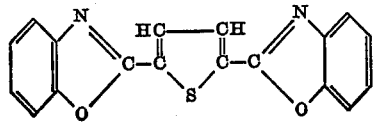

is suction-filtered and dried. Yield: 11 parts: M.P. 212.5-213°.

Analysis of a product recrystallized 4 times from a mixture of dimethylformamide and water gives the following data:

Calculated: C, 67.91; H, 3.17; N, 8.80. Found: C, 67.91; H, 3.28; N, 8.59.

*Example 5*

2.8 parts of the compound obtained in accordance with Example 1 are dissolved in 30 parts of alcohol containing 1 part of sodium hydroxide. 1.2 parts of α-glycerin chlorhydrin are added dropwise during 2 hours at 70° with stirring, and stirring is then continued for 1 hour. 50 parts of water are then added to the solution and the precipitated product of the formula:

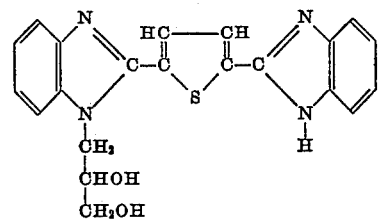

is suction-filtered. Yield: 3.4 parts.

The product, recrystallized 5 times form a mixture of alcohol and water, melts at 329-331° and analysis thereof gives the following data:

Calculated: C, 64.60; H, 4.65; N, 14.35. Found: C, 64.85; H, 4.62; N, 14.88.

*Example 6*

9.5 parts of the compound obtained in accordance with Example 1 are dissolved in 100 parts of alcohol containing 3 parts of sodium hydroxide. 3.6 parts of ethylene chlorhydrin are added dropwise within 2 hours at 70° with stirring, whereafter stirring is continued for 1 hour. 150 parts of water are then added to the solution and the precipitated product of the formula:

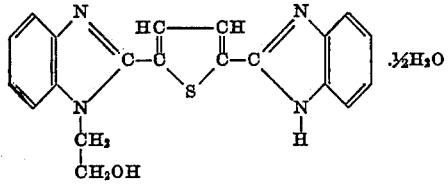

is suction-filtered. Yield: 10.5 parts.

The product, recrystallized 5 times from dimethylformamide and water, melts at 276-278° and analysis thereof gives the following data:

Calculated: C, 65.01; H, 4.66; N, 15.22. Found: C, 64.56; H. 5.01; N, 15.28.

*Example 7*

If in Example 5 the 1.2 parts of α-glycerin chlorhydrin are replaced by 1.4 parts of benzyl chloride, a product of the following formula is obtained:

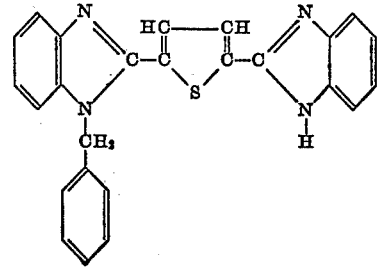

in the form of greenish-yellow needles. Yield: 3.5 parts.

The product, recrystallized six times from a mixture of ethanol and water, melts at 295–296°, and analysis thereof gives the following data:

$C_{25}H_{18}N_4S$

Calculated: C, 73.87; H, 4.46; N, 13.78. Found: C, 73.56; H, 4.52; N, 13.68.

*Example 8*

3.5 parts of the compound obtained in accordance with Example 3 are dissolved in 40 parts of ethanol containing 1.6 parts of sodium hydroxide. 3.4 parts of ethylene chlorhydrin are added dropwise in 6 hours at 70° with stirring. After stirring for a further hour, 100 parts of water are added dropwise to the solution, and the precipitated product of the formula

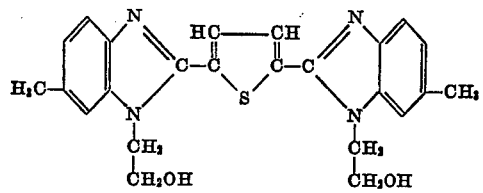

is suction-filtered. Yield: 4.5 parts.

The product recrystallized four times from a mixture of ethanol and water, melts at 235–236°, and analysis thereof gives the following data:

$C_{24}H_{24}O_2N_4S$

Calculated: C, 66.55; H, 5.56; N, 12.96. Found: C, 66.11; H, 5.71; N, 12.81.

*Example 9*

Polyacrylonitrile fabric (for example "Orlon") is treated for 30 minutes at about 90° with 0.01% of the product obtained in accordance with Example 1, in a bath containing 1 g. of 85% formic acid per liter, the liquor ratio being 1:50. The material is then rinsed and dried.

The fabric thus obtained is whiter than the untreated material.

If the compound of Example 2 is used instead of that of Example 1, a similar brightening effect is obtained.

*Example 10*

A soap (sodium salt) of higher fatty acids is prepared, which contains 0.005% of the product obtained in accordance with Example 1. Cotton fabrics washed with this soap at about 40–60° have a brighter appearance than the material washed only with soap not containing the brightening agent.

A similar effect is obtained if, instead of the soap, a synthetic detergent, for example the sodium salt of 2-heptadecyl-N-benzyl-benzimidazyl-di-sulfonic acid, is employed.

If the compound of Example 2 is used instead of that of Example 1, a corresponding favorable effect is obtained.

What is claimed is:
1. A thiophene derivative of the formula

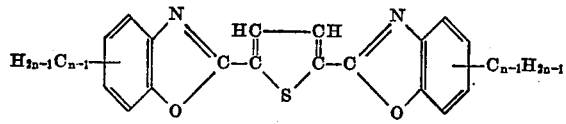

in which $n$ represents a whole number of at the most 2,
2. A thiophene derivative of the formula

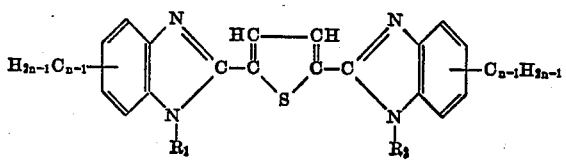

in which $n$ represents a whole number of at the most 2, and $R_1$ and $R_2$ each represents a member selected from the group consisting of a hydrogen atom, a lower alkyl radical, a lower hydroxyalkyl radical and a benzyl radical.

3. A thiophene derivative of the formula

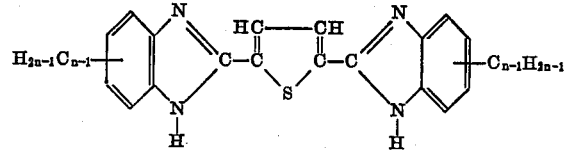

in which $n$ represents a whole number of at the most 2.

4. The thiophene derivative of the formula

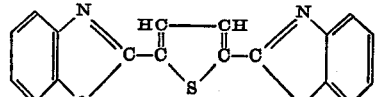

5. The thiophene derivative of the formula

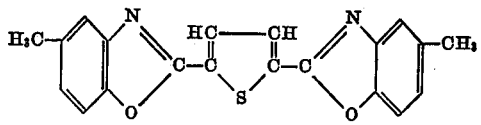

6. The thiophene derivative of the formula

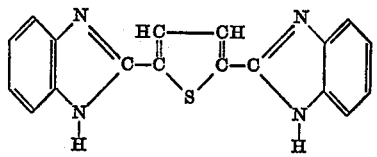

7. The thiophene derivative of the formula

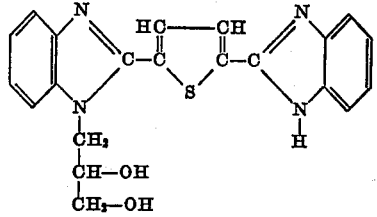

8. The thiophene derivative of the formula

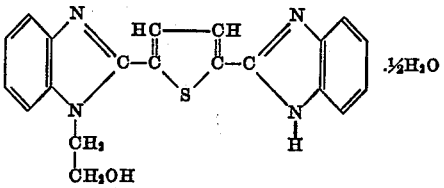

References Cited in the file of this patent
UNITED STATES PATENTS 2,808,407    Ackermann et al. _____ Oct. 1, 1957

FOREIGN PATENTS 211,167    Australia _____ Oct. 24, 1957
588,972    Great Britain _____ June 9, 1947

OTHER REFERENCES

Buu-Hoï et al.: Chem. Abstracts, vol. 43, col. 4665–6 (1949).